US008632343B2

(12) United States Patent
Blackburn

(10) Patent No.: US 8,632,343 B2
(45) Date of Patent: Jan. 21, 2014

(54) DEMONSTRATION MANNEQUIN FOR SIMULATING CATHETER MALPOSITION

(75) Inventor: Paul L. Blackburn, Wood Cross, UT (US)

(73) Assignee: C. R. Bard, Inc., Murray Hill, NJ (US)

( * ) Notice: Subject to any disclaimer, the term of this patent is extended or adjusted under 35 U.S.C. 154(b) by 80 days.

(21) Appl. No.: 13/111,327

(22) Filed: May 19, 2011

(65) Prior Publication Data

US 2011/0287398 A1   Nov. 24, 2011

Related U.S. Application Data

(60) Provisional application No. 61/346,144, filed on May 19, 2010.

(51) Int. Cl.
G09B 23/28       (2006.01)
(52) U.S. Cl.
USPC .......................................... 434/272; 434/267
(58) Field of Classification Search
USPC .................... 434/267, 272; 600/434
See application file for complete search history.

(56) References Cited

U.S. PATENT DOCUMENTS

| | | | | | |
|---|---|---|---|---|---|
| 3,009,267 | A | * | 11/1961 | Bezark | 434/272 |
| 3,771,173 | A | * | 11/1973 | Lamb, Jr. | 623/3.28 |
| 6,062,866 | A | * | 5/2000 | Prom | 434/268 |
| 6,106,301 | A | * | 8/2000 | Merril | 434/262 |
| 6,773,263 | B2 | | 8/2004 | Nicholls et al. | |
| 2005/0181343 | A1* | | 8/2005 | Ault et al. | 434/272 |
| 2008/0293029 | A1* | | 11/2008 | Wilkins et al. | 434/272 |
| 2009/0105631 | A1* | | 4/2009 | Kieval | 604/9 |
| 2009/0156926 | A1* | | 6/2009 | Messerly et al. | 600/409 |
| 2010/0099067 | A1 | | 4/2010 | Agro | |

FOREIGN PATENT DOCUMENTS

CN   201374144   * 12/2009
CN   201374144 Y   12/2009

OTHER PUBLICATIONS

Gibbs, Frantz J.; Murphy, Michael C. "Ultrasound Guidance for Central Venous Catheter Placement". Hospital Physician. Mar. 2006. pp. 23-31.*
PCT/US2011/037151 filed May 19, 2011 Written Opinion and International Search Report dated Sep. 2, 2011.

* cited by examiner

Primary Examiner — Kathleen Mosser
Assistant Examiner — Peter J Alley
(74) Attorney, Agent, or Firm — Rutan & Tucker, LLP

(57) ABSTRACT

A demonstration mannequin for simulating insertion of a catheter or other medical device into the body of a patient is disclosed. The mannequin is useful for training clinicians in the placement of a catheter into the patient's vasculature and includes the ability to provide a malposition scenario in which the catheter is deviated from an intended path within the vasculature, resulting in a simulated malposition thereof. In one embodiment, the mannequin comprises a torso body portion and a simulated vasculature disposed within the body. The simulated vasculature is accessible by a medical device, such as a catheter, which can be advanced within the simulated vasculature. The mannequin further includes at least one diversion element that selectively obstructs a portion of the simulated vasculature to block advancement of a distal end of the catheter along an intended path and instead causes diversion of the catheter, thus simulating a catheter malposition scenario.

8 Claims, 8 Drawing Sheets

DEMONSTRATION MANNEQUIN FOR SIMULATING CATHETER MALPOSITION

CROSS-REFERENCE TO RELATED APPLICATIONS

This application claims the benefit of U.S. Provisional Patent Application No. 61/346,144, filed May 19, 2010, and entitled "Demonstration Mannequin for Simulating Catheter Malposition," which is incorporated herein by reference in its entirety.

BRIEF SUMMARY

Briefly summarized, embodiments of the present invention are directed to a demonstration mannequin for simulating insertion of a catheter or other medical device into a body of a patient. The mannequin is useful for training clinicians in the placement of a catheter into the patient's vasculature and includes the ability to provide a malposition scenario in which the catheter is deviated from an intended path within the vasculature, resulting in a simulated catheter malposition. This enables clinicians to be trained in recognizing catheter malpositions in actual placement scenarios and in correcting such malpositions.

In one embodiment, the mannequin comprises a body and a simulated vasculature disposed within the body. The simulated vasculature is accessible by a medical device, such as a catheter, which can be advanced within the vasculature by the clinician. The mannequin further includes at least one diversion element that selectively obstructs a portion of the simulated vasculature to block advancement of a distal end of the catheter along an intended path, and instead causes diversion of the catheter, thus simulating a catheter malposition scenario. In one embodiment, the mannequin can be operably connected to a catheter tracking system so as to cause and/or detect the catheter malposition.

These and other features of embodiments of the present invention will become more fully apparent from the following description and appended claims, or may be learned by the practice of embodiments of the invention as set forth hereinafter.

BRIEF DESCRIPTION OF THE DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the present invention, and are neither limiting nor necessarily drawn to scale.

For clarity it is to be understood that the word "proximal" refers to a direction relatively closer to a clinician using the device to be described herein, while the word "distal" refers to a direction relatively further from the clinician. For example, the end of a catheter placed within the body of a patient is considered a distal end of the catheter, while the catheter end remaining outside the body is a proximal end of the catheter. Also, the words "including," "has," and "having," as used herein, including the claims, shall have the same meaning as the word "comprising."

Embodiments of the present invention are generally directed to a demonstration mannequin for use in training clinicians in the placement of a catheter or other medical device into the vasculature of a patient. In particular, the mannequin includes the ability to provide a malposition scenario in which the catheter is deviated from an intended path within the vasculature to a diversion path, resulting in a simulated malposition thereof. This enables clinicians to be trained in recognizing catheter malpositions in actual placement scenarios and in correcting such malpositions. In one embodiment, the mannequin can be operably connected to a catheter tracking system so as to cause and/or detect a catheter malposition.

Figure 1:
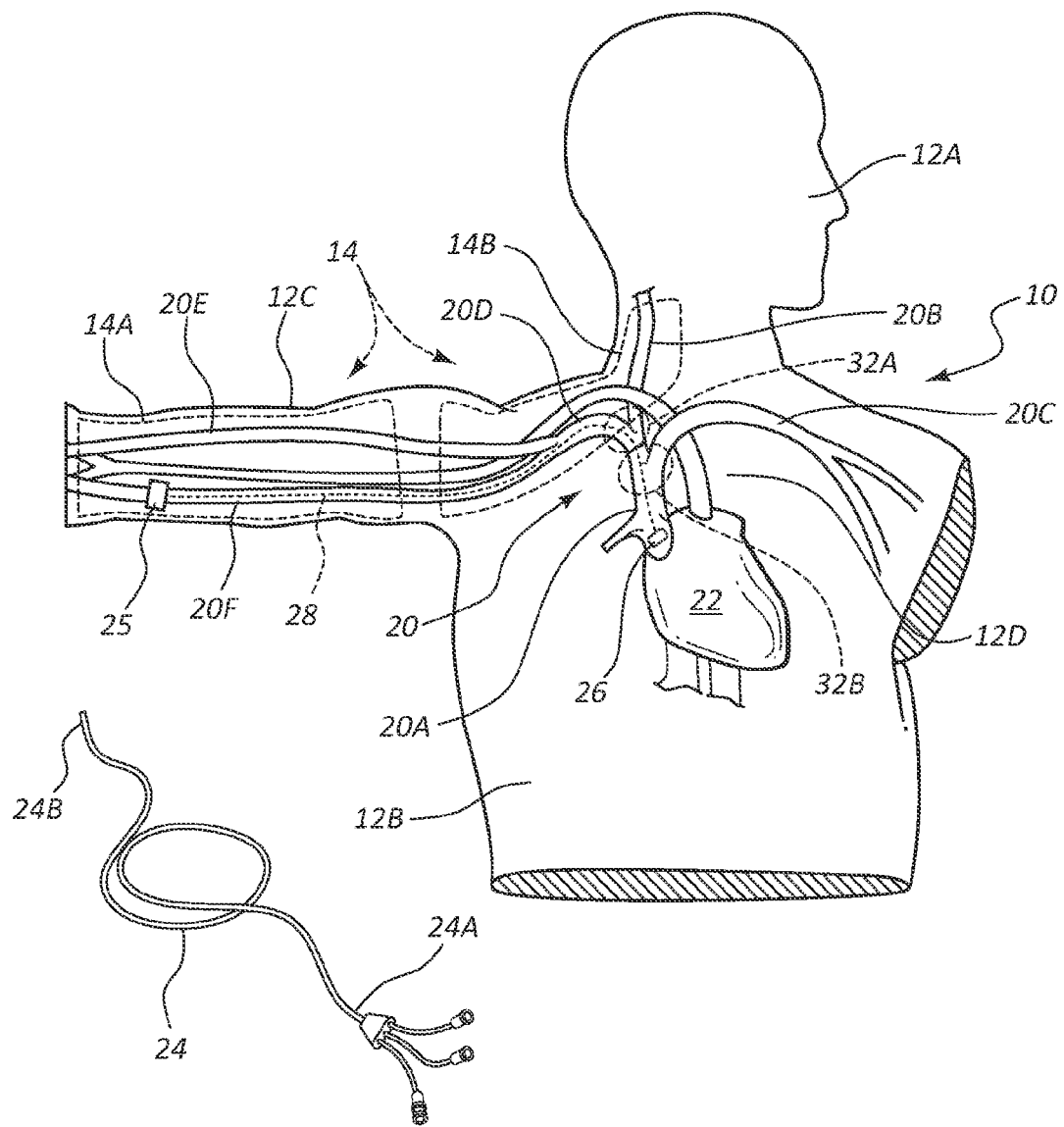
FIG. 1 is a simplified, partial cutaway front view of a demonstration mannequin in accordance with one embodiment.

Reference is first made to FIG. 1, which depicts various details regarding a demonstration mannequin, generally designated at 10, according to one embodiment. The mannequin 10 includes a body 12 that simulates the upper torso of a patient. In detail, the mannequin body 12 defines a head/neck portion 12A, a torso 12B, and an extended arm 12C. The body 12 is covered with a skin-like or other suitable material, and further includes a chest surface 12D.

In the present embodiment, the mannequin 10 includes insertion areas 14 where a catheter 24 can be inserted into the body 12. As shown, two insertion areas 14 are included in the mannequin 10: an arm insertion area 14A and a neck insertion area 14B. Other insertion areas can be included in other areas of the mannequin as well. Each insertion area 14A and 14B is configured to possess the ability to be imaged by an ultrasound imaging device so as to enable viewing of a simulated vasculature 20 disposed within the mannequin body interior. Particularly, each insertion area 14 includes below the mannequin skin surface simulated subcutaneous tissue that mimics the response of actual body tissue to ultrasound signals such that an ultrasound imaging device can be employed to image a portion of the insertion area and locate a portion of the simulated vasculature 20 disposed therein. One source for the simulated tissue referred to herein is VATA, Inc., 308 Sequoia Pkwy, Canby, Oreg. 97013.

In more detail, the simulated vasculature ("vasculature") 20 includes a plurality of hollow vessels configured to replicate the vessels of the human body in size, configuration, and location. As such, in the present embodiment, the vasculature 20 includes various vessels, including a superior vena cava ("SVC") 20A, an internal jugular ("IJ") vessel 20B, a left brachiocephalic ("LB") vessel 20C, a right brachiocephalic ("RB") vessel 20D, a cephalic vessel 20E, and a basilic vessel 20F. The foregoing vessels 20A-20F are interconnected as shown in FIG. 1 and ultimately lead to a heart 22, also simulated in the mannequin, according to one embodiment. Optionally, additional or other vessels, including arteries, can be included within the mannequin. In other embodiments, other internal body structures or organs can be included so as to provide simulated access to such features.

In one embodiment, the mannequin 10 is configured to have inserted into the vasculature 20 a catheter 24, though other medical devices can also be inserted therein, in other embodiments. Including a proximal end 24A to which one or more extension legs are attached and a distal end 24B, the catheter 24 in the present embodiment is a peripherally inserted central catheter ("PICC"), though it is appreciated that catheters of a variety of types and configurations could also be employed, including central catheters, CVP catheters, PIV's, intermediate or extended dwell catheters, feeding catheters, etc. Also note that the mannequin could be configured so as to represent other areas of a patient's body.

FIG. 1 further shows an insertion site 25 on the arm insertion area 14A through which the catheter 24 can be initially introduced into the vasculature 20 using typical vascular access procedures, including ultrasound imaging of the area in order to locate and access a vessel, such as the basilic vein 20F over which the insertion site 25 is located in this example embodiment. The insertion site 25 can be indicated by a marker or the like on one of the insertion areas 14, or can be a clinician-chosen spot as determined by ultrasound imaging of the chosen insertion area 14. For a catheter inserted at the insertion site 25, FIG. 1 shows an intended path 28 the distal tip 25B of the catheter 24 will take through the vasculature 20 in order to arrive at a desired distal tip destination 26, which in the present embodiment is in the lower $1/3^{rd}$ portion of the SVC 20A. Again, note that the insertion site, the intended path, and the tip destination can vary from is shown and described herein.

In accordance with one embodiment, the mannequin 10 includes a malposition system for simulating the conditions of a catheter malposition within the vasculature of a patient. The malposition system includes predetermined malposition sites 32A and 32B, corresponding to the junctions of the RB vessel 20D with the IJ vessel 20B (32A) and the SVC 20A with the LB vessel 20C (32B). At these or other suitable sites within the vasculature 20, elements can be included to selectively divert the catheter during its advancement within the vasculature from the intended path 28 to a diversion path. For instance, diversion of the catheter distal tip 24B from the intended path at the malposition site 32A causes the distal catheter tip to travel superiorly into the IJ vessel 20B instead of travelling inferiorly toward the SVC 20A. Likewise, diversion of the catheter distal tip 24B from the intended path at the malposition site 32B causes the distal catheter tip to travel contralaterally into the LB vessel 20C instead of continuing inferiorly toward the SVC 20A. Note that the number and positioning of the malposition sites can vary from what is shown and described herein. One optional location for inclusion of a malposition site includes deviation into the azygous vein, for instance.

Figure 2A:
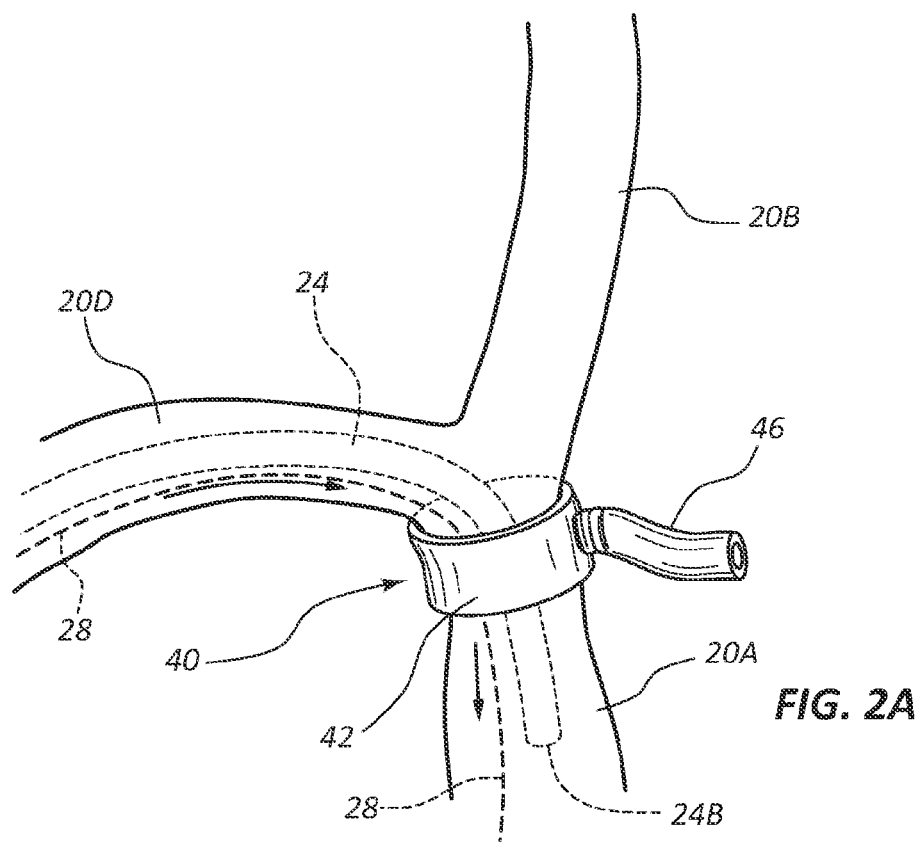
FIGS. 2A and 2B show one example of a diversion element of the mannequin of FIG. 1 in a first and a second position, respectively.
Figure 2B:
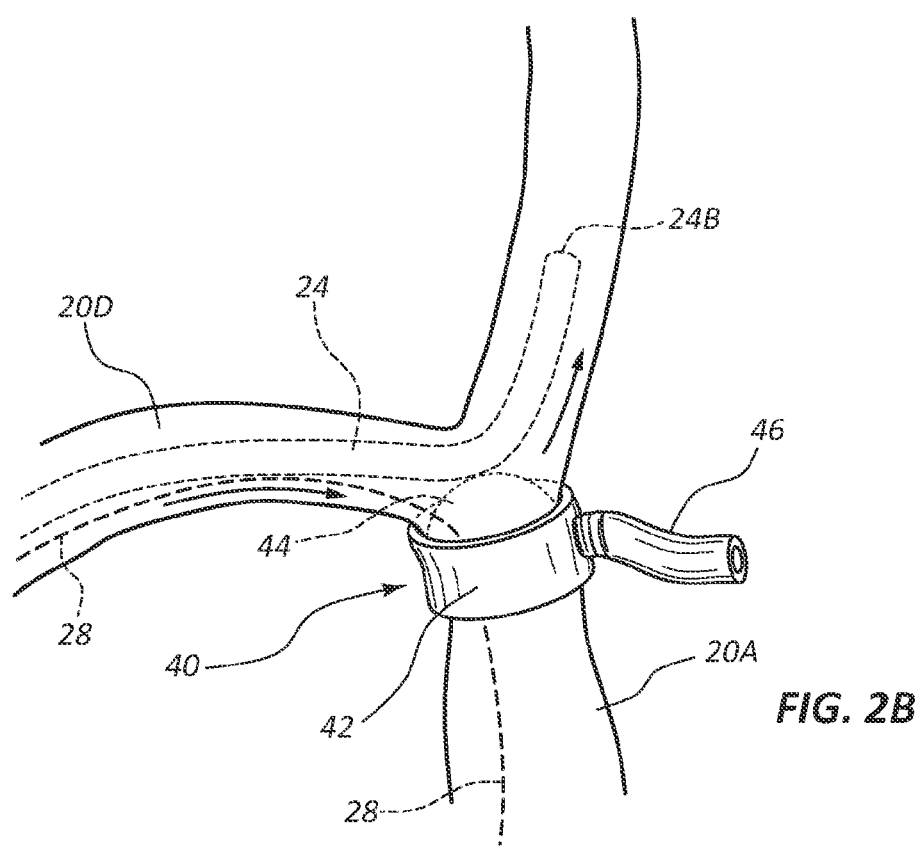
Figure 2C:
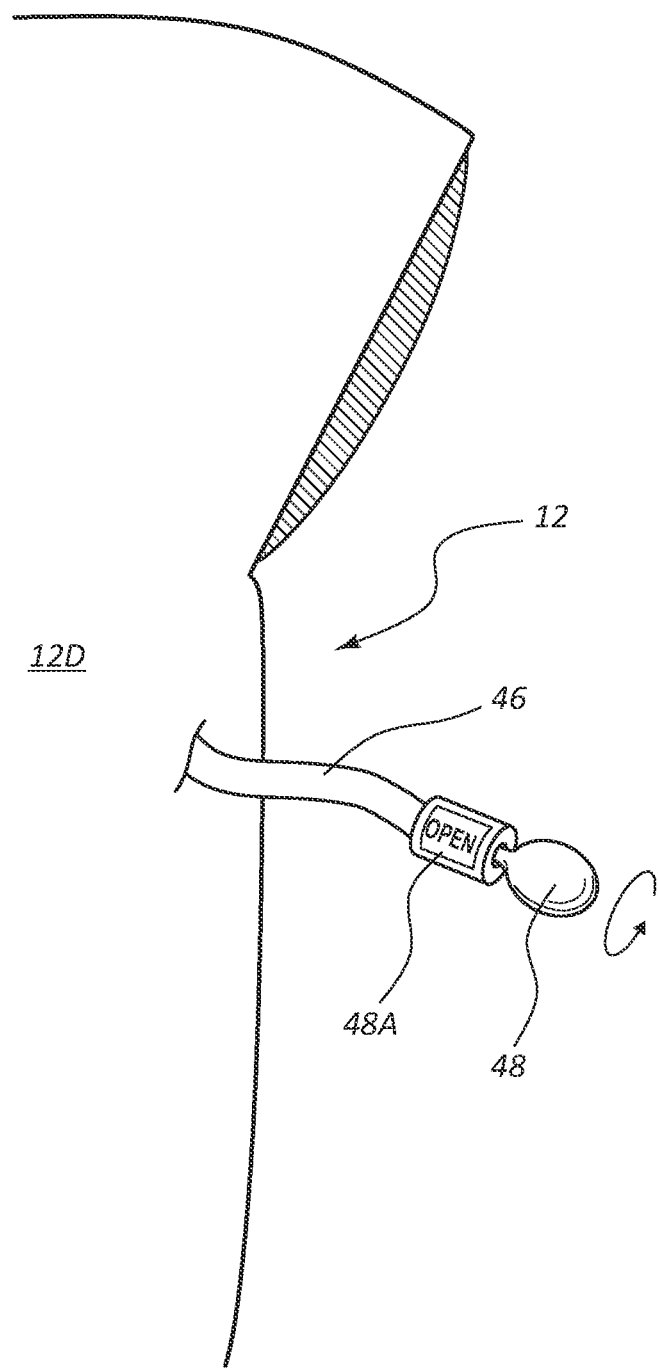
FIG. 2C shows an example actuator for the diversion element as shown in FIGS. 2A and 2B.

FIGS. 2A-2C give details of a diversion element 40 that can be included at one or both malposition sites 32, according to one embodiment, in order to selectively divert the distal tip 24B of the catheter 24 from the intended path 28 to a diversion path. As shown, the diversion element 40 includes a ball valve 42 disposed at the malposition site 32A, just inferior to the junction of the RB vessel 20D with the IJ vessel 20B. This location (i.e., the malposition site 32A) represents a common location for malpositions within the vasculature of actual patients during catheter insertion procedures.

The ball valve 42 includes a housing in which a rotatable ball 44 is disposed. A cable 46 is operably attached to the ball valve 42. The cable 46 in the present embodiment extends to the exterior of the mannequin body 12, as seen in FIG. 2C, to a handle 48 actuatable by a user or proctor of the mannequin 10. An indicator 48A on the handle 48 can indicate to the user the status of the ball 44 within the ball valve 42. Note that in this and the other embodiments, the diversion element can be manually activated by an external actuator, such as by the handle 48 discussed above, an internal actuator, remotely via RF or wireless signals, by an attached medical device tracking or control system, or by some other suitable actuation.

In particular, when the ball 44 is selectively rotated by the handle 48 so as to be open as shown in FIG. 2A, the ball valve 42 enables the catheter 24 to pass through without deviation from the intended path. When the ball 44 is closed as in FIG. 2B, however, the ball valve 42 prevents passage of the catheter 24 therethrough along the intended path 28 and will instead cause the catheter 24 to deviate its advancement into another vein, such as the IJ vessel 20B in this instance. As will be discussed below, such deviation can be detected by a catheter tracking system or otherwise detected by the clinician, enabling the clinician to identify when a malposition of the catheter 24 had occurred and to take corrective action.

After a malposition such as that shown in FIG. 2B has occurred, the ball valve 42 can be selectively opened once more, the catheter 24 partially retracted, then again advanced to pass through the open ball valve and along the intended path 28. Typical procedures are continued so as to advance the catheter 24 toward the tip destination 26 (FIG. 1). Note that the diversion element 40 is merely one example of a diversion element that can be selectively activated to obstruct the intended path through the vasculature. Indeed, other configurations, such as various actuatable valves and mechanical diversion elements, can be employed. Also, in this and other embodiments, the valve or other diversion element is fluid tight so as to not leak. In addition, the diversion element in this and other embodiments can be positioned with respect to the simulated vasculature so as to provide a smooth path and not disrupt advancement of the catheter past the diversion element when opened.

Figure 3A:
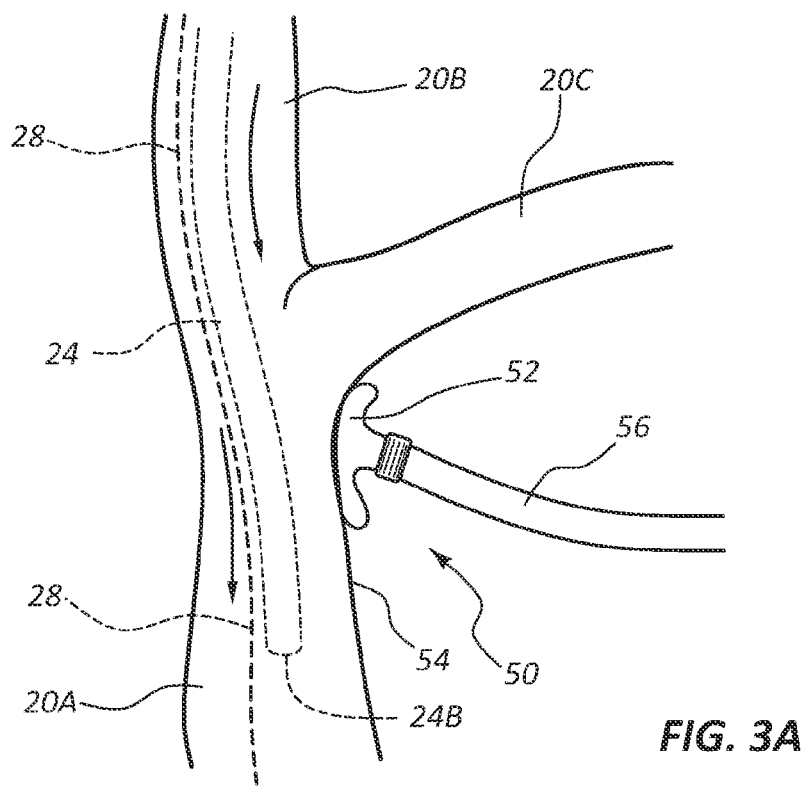
FIGS. 3A and 3B show one example of a diversion element of the mannequin of FIG. 1 in a first and a second position, respectively.
Figure 3B:
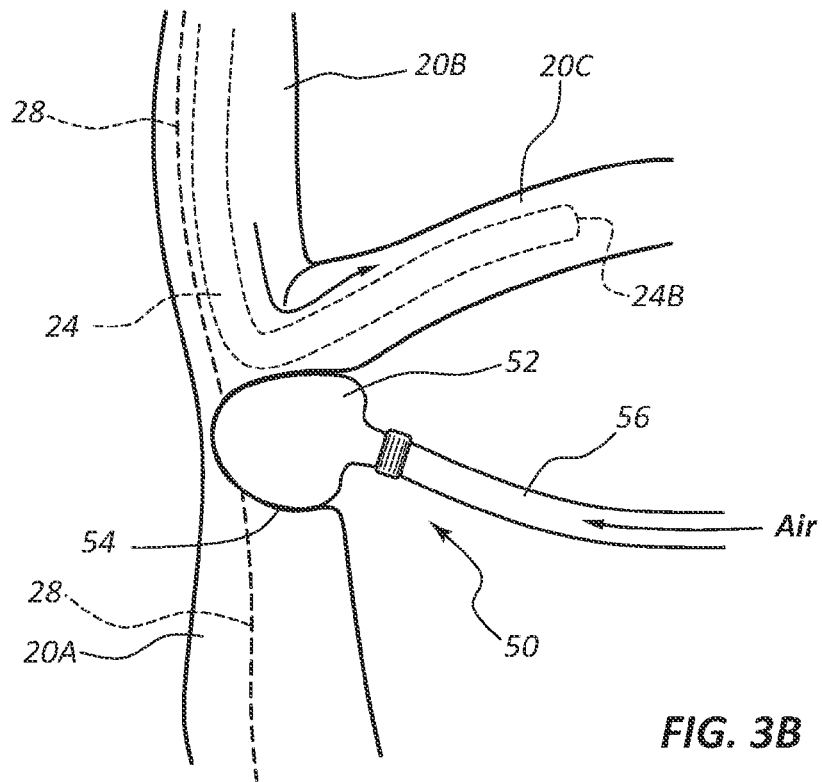
Figure 3C:
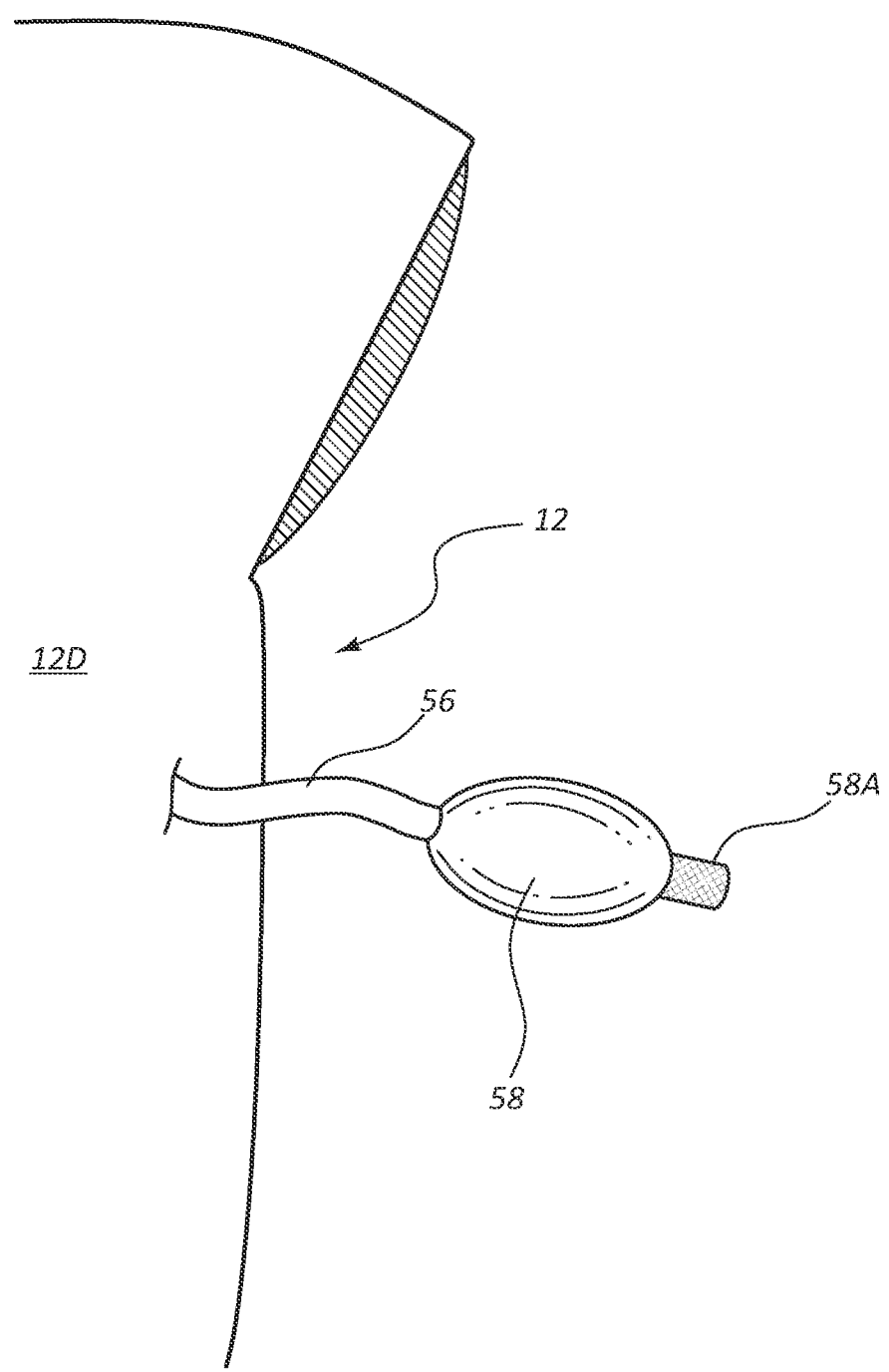
FIG. 3C shows an example actuator for the diversion element of FIGS. 3A and 3B.

FIGS. 3A-3C show another example of a diversion element 50, wherein an inflatable element, such as a balloon 52, is positioned at a malposition site 32, such as the malposition site 32B shown here. As shown, the balloon 52 is disposed external to a corresponding portion of a wall 54 of the SVC 20A just inferior to the junction of the SVC with the IJ vessel 20B and the LB vessel 20C. This location (i.e., the malposition site 32B) represents a common location for malpositions within the vasculature of actual patients during catheter insertion procedures.

As seen in FIG. 3B, the balloon 52 can be selectively inflated to compress the vessel wall 54, thus obstructing the intended path 28 of the catheter 24 and preventing passage of the catheter through the diversion element 50. An inflation tube 56, operably attached to the balloon 52, extends to the exterior of the mannequin 10, as shown in FIG. 3C. A hand pump 58 is included at the end of the inflation tube 56 to enable selective manual inflation of the balloon 52. Further advancement of the catheter 24 will result in diversion of the distal tip 24B thereof into a diversion path, such as advancement into the LB vessel 20C in the illustrated example. Again, such deviation can be detected by a catheter tracking system or otherwise detected by the clinician, enabling the clinician to identify when a malposition of the catheter 24 had occurred and to take corrective action.

A release valve 58A can be included with the pump 58 to selectively deflate the balloon 52, thus restoring the vessel to patent condition and enabling the catheter 24 to be advanced unimpeded along the intended path. Of course, other actuation elements can be used to inflate the balloon, such as motor-driven and automatic inflators.

Note that the above-described embodiments are merely examples of possible diversion elements that can be employed within the mannequin to selectively obstruct a vessel and cause diversion of a catheter being advanced through the simulated vasculature. Other physical elements, both manually and/or remotely or automatically actuated can also be employed to define a diversion element to perform as generally described herein. Thus, the present disclosure should not be limited by the above-described embodiments.

Figure 4:
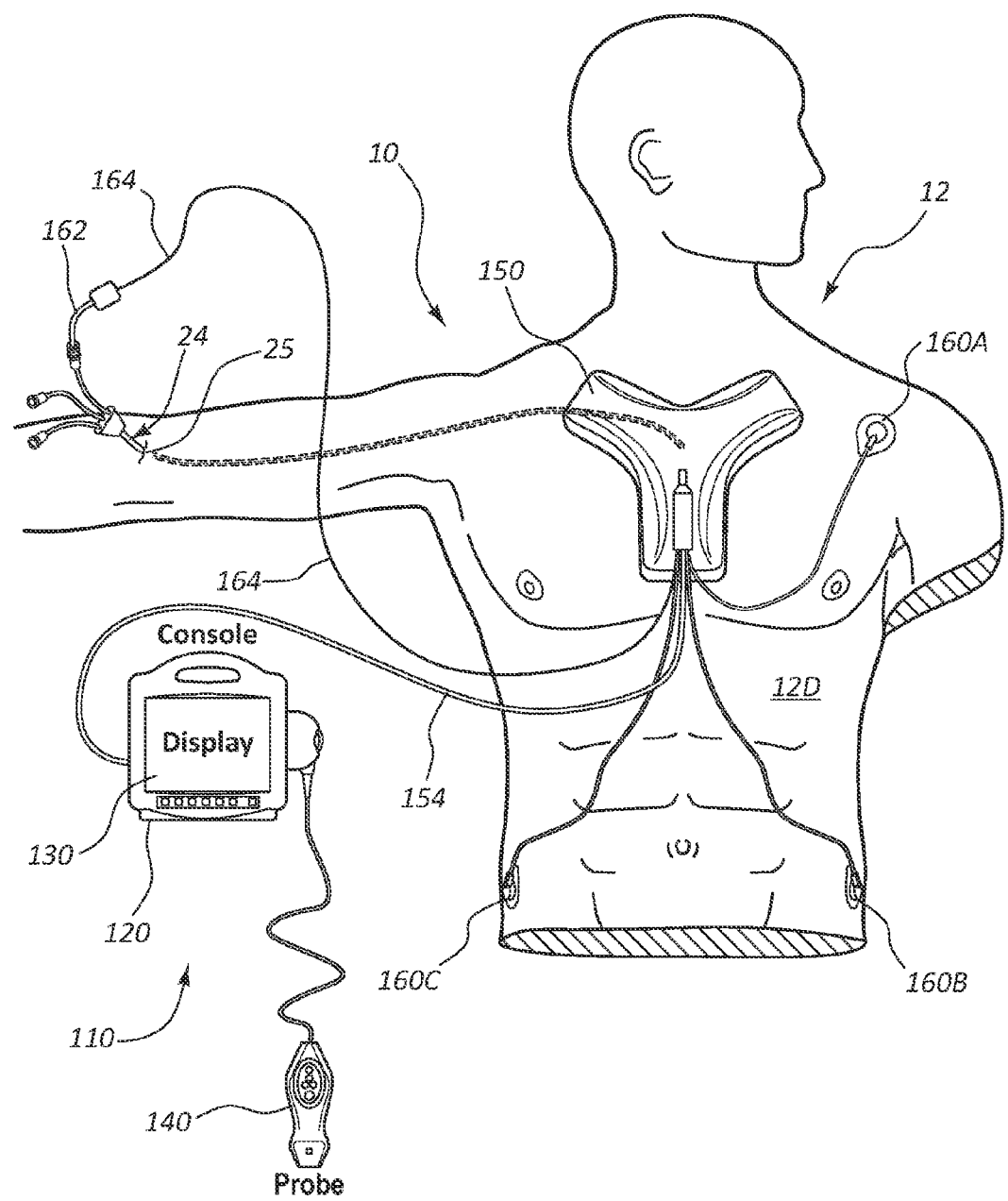
FIG. 4 shows the mannequin of FIG. 1 together with a catheter tracking system according to one embodiment.

Reference is now made to FIG. 4. Diverting the catheter 24 by the diversion elements 40, 50 in the manner described above can be useful to train clinicians in detecting when a catheter malposition has occurred in an actual catheter placement procedure. In particular, catheters are often placed with the assistance of a catheter tracking system that can monitor the position and/or advancement of the catheter through the patient's vasculature. FIG. 4 shows one such tracking system at 110, including a console 120 with a display 130, and an ultrasound probe 140 operably attached thereto. A sensor 150 of the system 110 is configured for placement on the chest of the patient/mannequin 10, as shown in FIG. 4. A cable 154 operably connects the sensor 150 to the console 120. A plurality of electrodes 160, including electrodes 160A, 160B, and 160C that extend from and operably connect to the sensor 150, are shown attached to the mannequin 10 at attachment locations similar to those on an actual patient. A stylet 162 is disposed within a lumen of the catheter 24 (which catheter is shown inserted into the mannequin 10 via the insertion site 25) and is operably connected to the sensor 150 via a tether 164.

The tracking system 110 is adapted to assist with initial insertion of the catheter 24 into, and advancement within, the vasculature 20 via three modalities: ultrasound imaging of the vasculature proximate the insertion site 25 via the ultrasound probe 140; magnet-based tracking of the catheter distal tip 24B via magnetic elements disposed in the distal tip of the stylet 162, which is disposed within the catheter lumen; and ECG-based tracking of the catheter distal tip via ECG measurements detected by the electrodes 160A-160C and an ECG sensor disposed on the intra-catheter stylet 162. Further details regarding the catheter tracking system 110 and similar systems can be found in: U.S. Patent Application Publication No. 2010/0036227, filed Sep. 10, 2009, and entitled "Apparatus and Display Methods Relating to Intravascular Placement of a Catheter;" U.S. Patent Application Publication No. 2010/0318026, filed Aug. 10, 2010, and entitled "Devices and Methods for Endovascular Electrography;" and U.S. Patent Application Publication No. 2011/0196248, filed Feb. 2, 2011, and entitled "Apparatus and Method for Catheter Navigation and Tip Location," each of which is incorporated herein by reference in its entirety. Other catheter tracking devices and systems can also be used.

As mentioned, in one embodiment a catheter tracking system, such as the system 110 of FIG. 4, can be employed in conjunction with the mannequin 10 to track the catheter 24 through the simulated vasculature 20 during a simulated catheter insertion procedure. The tracking system 110 can be coordinated with one or more of the diversion elements so as to visually depict or otherwise inform the clinician as to the existence of a simulated catheter malposition, i.e., when the catheter has deviated from the intended path to diversion path as caused by actuation of one or more of the diversion elements 40, 50. This enables the clinician to learn to recognize when such a malposition has occurred by monitoring visual, audible, or other output provided by the catheter tracking system 110, and take steps to correct the situation.

It is further appreciated that in one embodiment the catheter tracking system 110 can include a malposition training mode. This training mode can be automatically or user-selected via a button or the like on the console 120 and enables the system to mimic conditions present when a catheter is malpositioned, including ECG data, magnet-based catheter tip position/orientation information, etc. Use of the catheter tracking system 110, together with malpositioning of the catheter 24 in the mannequin 10 as described herein, can provide a realistic scenario for training purposes. In yet another embodiment, the catheter tracking system can selectively cause actuation of the diversion elements.

As discussed, the tracking system 110 includes the sensor 150 that is placed on the chest surface 12D of the patient/mannequin 10 in the manner shown in FIG. 4 so as to enable tracking of the catheter 24 by the tracking system during advancement through the simulated vasculature 20. When employing the sensor 150 during catheter advancement, it is important to properly position the sensor with respect to the heart 22 and/or the intended tip destination 26 (FIG. 1) so as to enable the catheter tracking system 110 to properly track the catheter through the mannequin 10.

Figure 5:
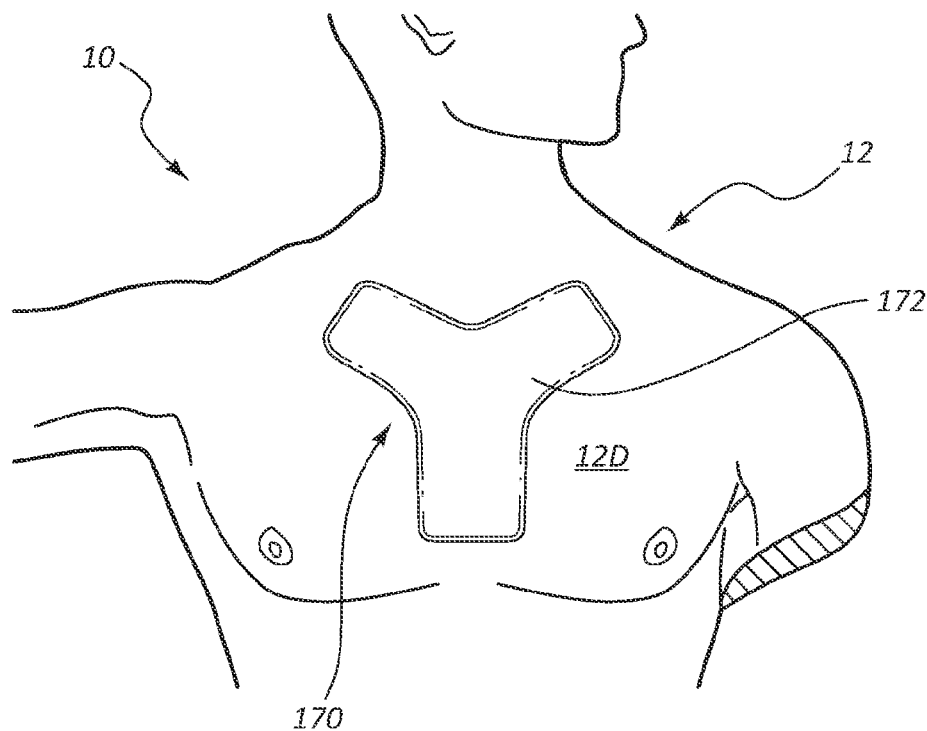
FIG. 5 shows one example of a placement cue for assisting with placement of the sensor of FIG. 4.

In light of the above, in one embodiment a sensor placement cue 170 can be included on the mannequin 10 to help train a clinician in the proper placement of the sensor 150 on the chest surface 12D. FIG. 5 gives an example of one such placement cue 170 in accordance with one embodiment, wherein the cue includes a depression 172 formed in the chest surface 12D of the mannequin 10 defining the shape of the outer perimeter of the sensor 150 at the location where the sensor is to be placed.

Figure 6:
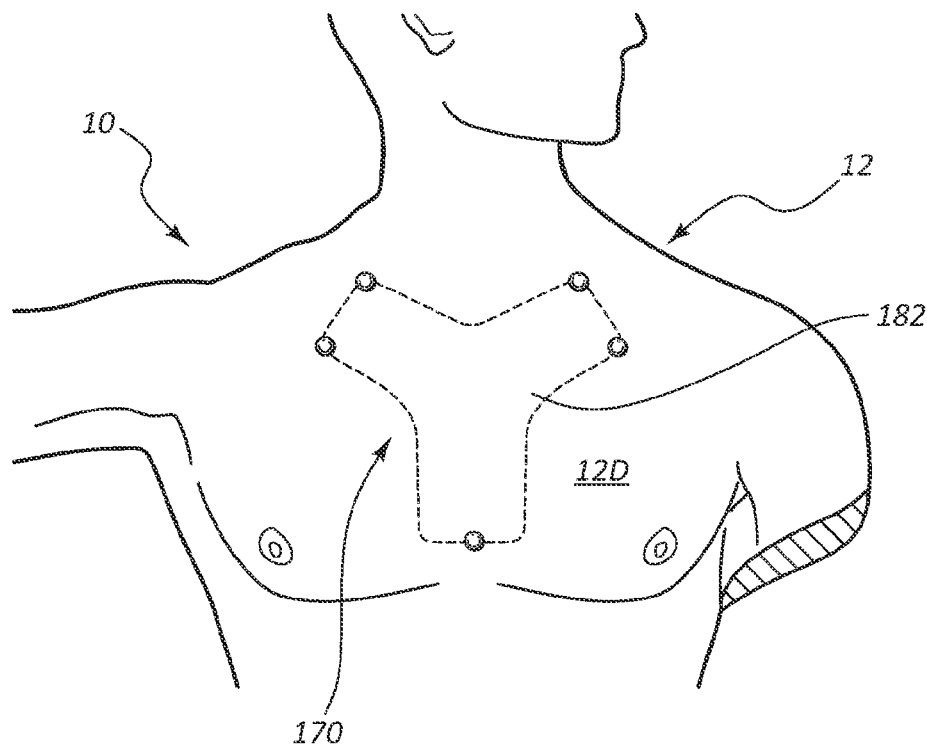
FIG. 6 shows another example of a placement cue for assisting with placement of the sensor of FIG. 4.

FIG. 6 gives another example of the placement cue 170 according to one embodiment, wherein the cue includes a pattern 182 defined by a plurality of protuberances on the mannequin chest surface 12D. The protuberances are arranged about a shape corresponding to the outer perimeter of the sensor 150 so as to assist in proper placement thereof on the chest of the mannequin 10.

Figure 7:
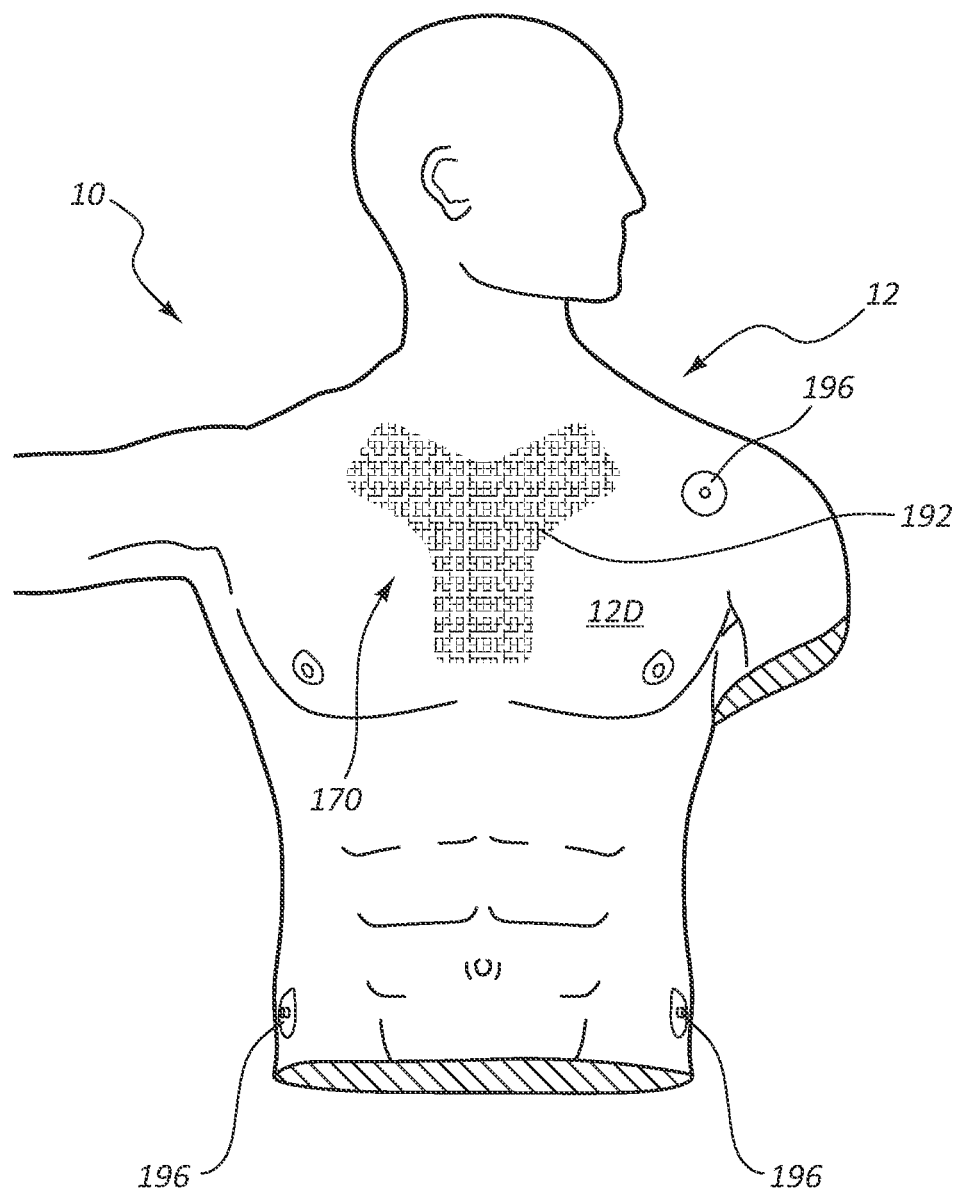
FIG. 7 shows yet another example of a positioning cue for assisting with placement of the sensor of FIG. 4, together with electrode connection points included with the mannequin according to one embodiment.

In FIG. 7, the placement cue 170 in one embodiment includes a shaded region 192 in the shape of the sensor 150 at the position where the sensor is to be placed on the chest surface 12D of the mannequin 10. It should be noted that the embodiments depicted and described herein are merely examples of placement cues to be used with the mannequin. Indeed, other types of placement cues can be employed. For example, instead of a solid shaded region as shown in FIG. 7, an outline-only region can be included on the mannequin chest surface. Further, the shape and size of the sensor can also vary. These and other variations are therefore contemplated.

FIG. 7 further shows one feature of the mannequin according to one embodiment, wherein a plurality of electrode connection features 196 is included on the surface of the mannequin 10. Including a snap feature in the present embodiment, each electrode connection feature 196 is configured to operably connect with a standard ECG electrode, such as one of the ECG electrodes 160A-160C shown in FIG. 4. The electrode connection features 196 are positioned on the mannequin 10 at the locations where ECG electrodes are typically placed on a patient during an actual catheter placement procedure, though it is appreciated that the features can be positioned in other areas as well. Similarly, the number of contacts can be fewer or more than three. Also, the electrode connection features can be movable to other positions on the mannequin, in one embodiment, and can be permanently or temporarily affixed to the mannequin. A connecting wire or other structure for electrically connecting the electrode connection features 196 is included within the body of the mannequin 10, in the present embodiment. In another embodiment, it is appreciated that the mannequin can be configured to emit ECG signals for detection by a suitably equipped catheter tracking system, such as the system 110 shown in FIG. 4. So configured, the mannequin can be used in concert with the catheter tracking system to simulate ECG signal reception by the system during advancement of a catheter through the simulated vasculature of the mannequin.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A method for simulating insertion of a catheter into a patient using a demonstration mannequin, the mannequin including a body portion, a simulated vasculature disposed within the body portion and through which the catheter can be advanced, the method comprising:
    inserting the catheter into the simulated vasculature via an insertion site;
    advancing the medical device within the simulated vasculature; and
    selectively actuating a diversion element so as to cause the catheter to deviate from an intended path to a diversion path during advancement, including actuating a ball valve from a first open position to a second closed position, the ball valve disposed in the simulated vasculature on the intended path.

2. The method for simulating catheter insertion as defined in claim 1, wherein selectively actuating the diversion element is performed manually by a user via an actuator disposed exterior to the mannequin.

3. The method for simulating catheter insertion as defined in claim 1, wherein selectively actuating further comprises:
    selectively actuating the diversion element by a catheter tracking system operably attached to the mannequin.

4. The method for simulating catheter insertion as defined in claim 1, further comprising:
    selectively de-actuating the diversion element to enable the catheter to advance along the intended path past the diversion element.

5. The method for simulating catheter insertion as defined in claim 1, wherein the mannequin includes at least one region that can be ultrasonically imaged, and wherein the method further comprises:
    ultrasonically imaging an insertion site to identify a portion of the simulated vasculature before inserting the catheter.

6. A diversion assembly for use in obstructing an intended path for advancement of a catheter within a simulated vasculature of a demonstration mannequin, comprising:
    a diversion element that selectively causes obstruction of a portion of the simulated vasculature in order to cause a distal end of the catheter to be diverted from the intended path during advancement, the diversion element including a ball valve disposed in the simulated vasculature, the intended path extending through the ball valve; and
    an actuator for selectively causing the diversion element to obstruct the portion of the simulated vasculature.

7. The diversion assembly as defined in claim 6, wherein the diversion element is selectively movable from a first open position to permit advancement of the catheter past the diversion element to a second closed position to block catheter advancement past the diversion element.

8. The diversion assembly as defined in claim 6, wherein diversion of the distal end of the catheter by the diversion element causes the distal catheter end to pass into a diversion vessel of the simulated vasculature, the diversion vessel not defining a portion of the intended path.

* * * * *